United States Patent
Flippin

(10) Patent No.: US 11,142,403 B1
(45) Date of Patent: Oct. 12, 2021

(54) SELF-ERECTING CARGO HANDLING POWER DRIVE UNIT

(71) Applicant: James Flippin, Clearwater, KS (US)

(72) Inventor: James Flippin, Clearwater, KS (US)

( * ) Notice: Subject to any disclaimer, the term of this patent is extended or adjusted under 35 U.S.C. 154(b) by 0 days.

(21) Appl. No.: 17/138,765

(22) Filed: Dec. 30, 2020

(51) Int. Cl.
*B65G 13/06* (2006.01)
*B65G 23/08* (2006.01)

(52) U.S. Cl.
CPC .......... *B65G 13/065* (2013.01); *B65G 23/08* (2013.01)

(58) Field of Classification Search
CPC .... B65G 13/065; B65G 13/07; B65G 13/071; B65G 13/12; B65G 23/06; B65G 23/08;
(Continued)

(56) References Cited

U.S. PATENT DOCUMENTS

| | | | | |
|---|---|---|---|---|
| 1,026,465 A | * | 5/1912 | Scholz | B65F 3/12 414/303 |
| 1,868,825 A | * | 7/1932 | Grosjean | B21B 39/008 198/788 |

(Continued)

*Primary Examiner* — Joseph A Dillon, Jr.

(57) ABSTRACT

This disclosed Self-Erecting Cargo Handling Power Drive Unit (PDU) assembly is one of several such units installed in the load area of a cargo carrier at the below floor level for the propose of facilitating cargo movement in either forward or aft direction and is intended for larger individual pieces or cargo loaded on pallet. This self-erecting power drive unit (PDU) consists primarily of a mounting base unit, reversible drive motor with self-activating brake and toothed drive sprocket assembly, hinged drive motor mount, cog (toothed) belt with teeth on one side and a smooth side opposite, idler pulleys and pivot arms for the flanged idler pulleys. The reversible drive motor with self-activating brake and toothed drive sprocket assembly power the cog belt and many be operated in either forward or aft direction by selectively energizing the reversible drive motor. The reversible drive motor and toothed drive sprocket are assembled to the motor mount which is double hinged transversely to the power drive unit mounting base unit with the axes of both hinges parallel to the motor and toothed sprocket center line and displaced to either side and downward to form a triangular configuration. This double hinge is configured such that only one side will disengage at a time during operation, which permits the drive motor and toothed drive sprocket to rotate in either direction in an upward arc and around the engaged side of the hinge.

Displaced laterally, one on either side of the reversible drive motor and toothed drive sprocket, are smooth idler pulleys with their axes of rotation parallel to that of the reversible rive motor and toothed drive sprocket. The idler pulleys are mounted between pivot arms that extend laterally along the power drive unit assembly. The ends of the pivot arms opposite the idler pulleys are moveably fastened to the power drive unit mounting base and are free to rotate in vertical arc around this axis. The idler pulleys are provided with a slight resistance to rotation, which results in a small torque load on the reversible drive motor. This generates a reaction about either of the motor mount hinge axes depending upon the direction of reversible drive motor rotation. This reaction drives the motor and toothed drive sprocket assembly in an upward arc about the engaged side of the motor mount hinge, which deploys the power drive unit.

A cog belt of nominal width operates over the toothed drive sprocket with the cogs engaging teeth on the toothed drive sprocket and with the smooth side of the cog belt engaging the idler pulleys. The cog belt provides the tractive force to the cargo or cargo pallets, with the cogs engaging the bottom side of the cargo or cargo pallets. As the reversible drive motor is energized in either direction the upward arc of the reversible drive motor and toothed drive sprocket assembly (Continued)

moves the toothed drive sprocket toward the flanged idler pulley at the end of the power drive unit which is toward the direction of cargo or pallet travel. As this movement occurs, the flanged idler pulley rotates about the axis of the connected pivot arms and pushes the cog belt upward into contact with the lower side of the cargo or cargo pallet. This provides the self-erecting feature of this power drive unit. Because the reversible drive motor and toothed drive sprocket assembly operate in an upward arc, this assembly will first approach the idler pulley located at the end of the power drive unit which is toward the direction of cargo or cargo pallet travel. This reduces the shock of power drive unit and cargo or cargo pallet initial contact. The trailing end idler then moves upward as upward force from the toothed drive sprocket is maintained. The upward arc of the motor and drive sprocket in the direction of cargo movement produces greater upward force and traction from the power drive unit to the cargo or cargo pallet as the difficulty in moving the cargo increases. The power drive unit will remain deployed as the reversible drive motor with self-activating brake is de-energized. This will hold the cargo or cargo pallet in position to reduce the incidence of inadvertent motion. The cog belt will retract to below the cargo carrier floor level by momentarily reversing the drive motor to the retracted position prior to de-energizing the reversible drive motor. Prior art is already aware of circuitry to accomplish drive motor braking and control modes of operation.

6 Claims, 4 Drawing Sheets

(58) Field of Classification Search
CPC ........ B65G 23/10; B65G 23/16; B65G 25/06; B65G 39/18
USPC ... 198/408, 726, 730, 782, 781.03, 788, 809
See application file for complete search history.

(56) References Cited

U.S. PATENT DOCUMENTS

| | | | | |
|---|---|---|---|---|
| 1,881,267 A * | 10/1932 | Drexler | B21B 39/008 198/788 |
| 1,887,267 A * | 11/1932 | Kennedy | H02P 1/12 200/80 R |
| 1,889,173 A * | 11/1932 | Drexler | B21B 39/008 198/788 |
| 1,889,174 A * | 11/1932 | Drexler | B21B 39/008 384/494 |
| 1,960,900 A * | 5/1934 | Drexler | B21B 39/12 198/346.2 |
| 2,001,129 A * | 5/1935 | Drexler | B21B 39/04 198/580 |
| 2,018,255 A * | 10/1935 | Drexler | B21B 39/04 72/251 |
| 2,175,860 A * | 10/1939 | Waimann | B65G 23/08 198/788 |
| 2,897,783 A * | 8/1959 | Drexler | B30B 15/16 91/33 |
| 3,690,440 A * | 9/1972 | Macpherson | B65G 13/065 198/782 |
| 3,698,539 A * | 10/1972 | Schwarzbeck | B65G 13/065 198/722 |
| 3,737,022 A * | 6/1973 | DeNeefe | B65G 13/065 198/782 |
| 3,768,629 A * | 10/1973 | Bennett | B65G 25/02 198/721 |
| 4,088,224 A * | 5/1978 | Kittredge | B65G 13/07 198/783 |
| 4,294,292 A * | 10/1981 | Eberle | B65G 47/248 141/1 |
| 4,544,319 A * | 10/1985 | Folling | B64D 9/00 198/457.03 |
| 4,792,037 A * | 12/1988 | Huber | B65G 13/065 198/782 |
| 4,807,735 A * | 2/1989 | Huber | B65G 1/08 193/35 B |
| 4,832,185 A * | 5/1989 | Huber | B65G 13/11 198/788 |
| 4,860,615 A * | 8/1989 | Huber | B63H 23/08 475/143 |
| 4,871,052 A * | 10/1989 | Huber | B60B 33/08 193/35 MD |
| 4,949,837 A * | 8/1990 | Huber | B65G 13/06 198/782 |
| 5,020,657 A * | 6/1991 | Huber | B64D 9/00 198/782 |
| 5,022,513 A * | 6/1991 | Huber | B65G 13/065 198/782 |
| 5,025,915 A * | 6/1991 | Huber | B65G 13/065 198/782 |
| 5,033,601 A * | 7/1991 | Huber | B65G 39/025 193/35 MD |
| 5,033,611 A * | 7/1991 | Huber | B65G 13/065 198/782 |
| 5,033,644 A * | 7/1991 | Tentler | G05D 11/132 222/57 |
| 5,076,412 A * | 12/1991 | Huber | B60B 33/08 193/35 MD |
| 5,090,757 A * | 2/1992 | Huber | B25J 13/08 294/119.1 |
| 5,127,513 A * | 7/1992 | Huber | B65G 13/065 198/782 |
| 5,131,527 A * | 7/1992 | Huber | B65G 13/065 198/782 |
| 5,348,139 A * | 9/1994 | Szarkowski | B65G 47/261 198/781.05 |
| 5,657,857 A * | 8/1997 | Neilson | B65G 15/00 193/35 R |
| 5,810,175 A * | 9/1998 | Williamson | B07B 1/12 209/379 |
| 8,496,102 B2 * | 7/2013 | Schaferling | B65G 15/42 198/418.7 |
| 8,646,593 B2 * | 2/2014 | Andersson | B65G 67/24 198/611 |
| 8,910,773 B2 * | 12/2014 | Andersson | B65G 47/19 198/611 |
| 8,919,537 B2 * | 12/2014 | Andersson | B60P 1/38 198/611 |
| 9,042,645 B2 * | 5/2015 | Mainali | G06K 9/4671 382/170 |
| 9,109,646 B1 * | 8/2015 | Pritchard | F16D 27/14 |
| 9,266,676 B2 * | 2/2016 | Pfeiffer | B65G 13/071 |
| 9,511,860 B2 * | 12/2016 | Himmelmann | B64D 9/00 |
| 9,555,888 B2 * | 1/2017 | Himmelmann | B60V 3/025 |
| 9,567,166 B2 * | 2/2017 | Himmelmann | F04D 29/282 |
| 9,676,567 B2 * | 6/2017 | Panzram | B65D 88/14 |
| 9,701,465 B2 * | 7/2017 | Llopez-Miguel | B65D 88/72 |
| 9,776,720 B2 * | 10/2017 | Himmelmann | B65G 51/03 |
| 9,783,299 B2 * | 10/2017 | Himmelmann | B64D 9/00 |
| 9,784,276 B2 * | 10/2017 | Himmelmann | B64C 1/20 |
| 10,005,557 B2 * | 6/2018 | Himmelmann | B64C 1/20 |
| 11,040,829 B2 * | 6/2021 | Skanse | B65G 47/261 |
| 2004/0173436 A1 * | 9/2004 | Baker | B65G 47/54 198/370.08 |
| 2010/0181168 A1 * | 7/2010 | Eck | B64D 9/00 198/782 |
| 2013/0126300 A1 * | 5/2013 | Wolkerstorfer | B65G 13/10 198/370.09 |
| 2017/0362040 A1 * | 12/2017 | Wetters | B65G 13/07 |
| 2021/0032037 A1 * | 2/2021 | Skanse | B65G 13/071 |

* cited by examiner

SELF-ERECTING CARGO HANDLING POWER DRIVE UNIT

BACKGROUND OF THE INVENTION

This Invention relates to a self-erecting cargo handling power drive unit (PDV) assembly for the use in the movement of cargo or cargo pallets in the cargo space of cargo carriers.

BACKGROUND-DESCRIPTION OF PRIOR ART

The prior art is already aware of self-erecting power drive units of various configurations which are currently in use, primarily in aircraft cargo holds. These power drive units generally employ roller in which contract the underside of the cardo or pallets. An example of one such roller dive power drive unit is disclosed in U.S. Pat. No. 5,183,150 that disclose a self-erecting single roller power drive unit. Various other disclosures in the field include double roller units, swiveling unit and self-powered rollers as disclosed in:

These disclosed power drive units suffer the common drawback of line contact between the roller surface and the cargo or cargo pallet and the friction area is small, which limits the amount of force and traction that can be applied to move the cargo or cargo pallet. This condition is exacerbated should moisture be present on the contracting surfaces.

SUMMARY OF THE INVENTION

The self-erecting power drive unit of the present invention mounts in the floor area of cargo hold and operated in either the forward or aft direction, and rises upon activation from a retracted position to contact the lower side of cargo or pallet. It is the primary object of this invention to provide a self-erecting cargo handling power drive unit which provides a large area of contact between the power drive unit and the cargo or pallet for greater traction.

It is another object of the present invention to provide self-erecting cargo handling power drive unity which reduces the loss of traction in the presence of moisture on the contacting surfaces.

It is another object of the present invention to provide a self-erecting cardo handling power drive unit having component parts which are of a simple and rugged design and which can be easily assembled.

DETAILED DESCRIPTION

First Embodiment—FIGS. 1-7

Figure 1:
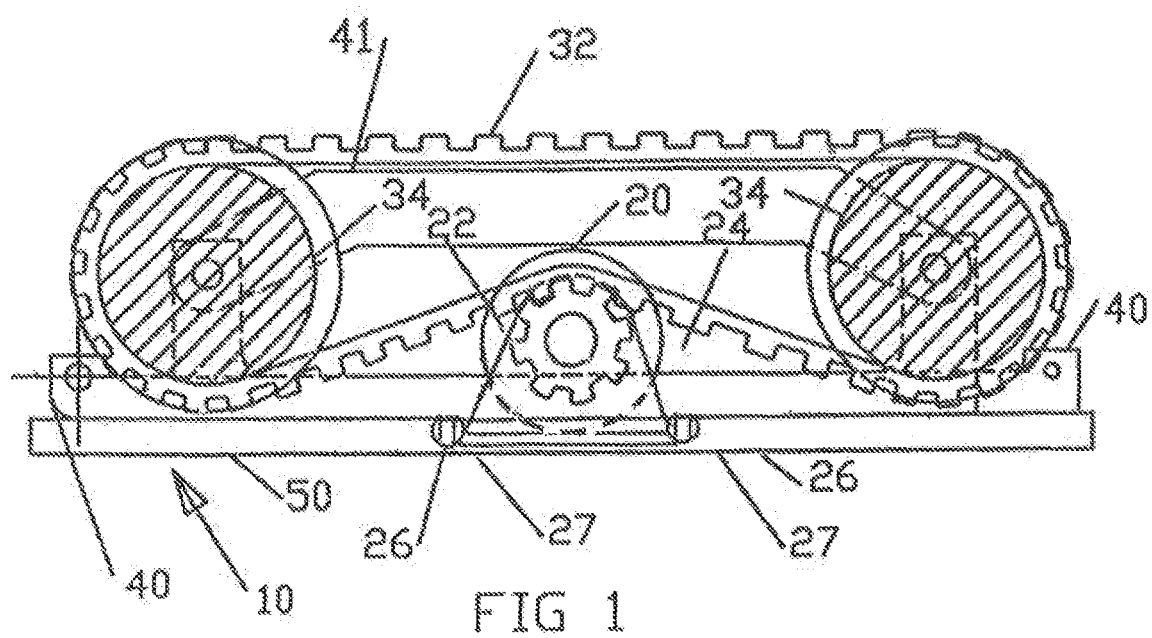
FIG. 1 is a sectional elevation view of cargo handling power drive unit shown in the retracted position.
Figure 2:
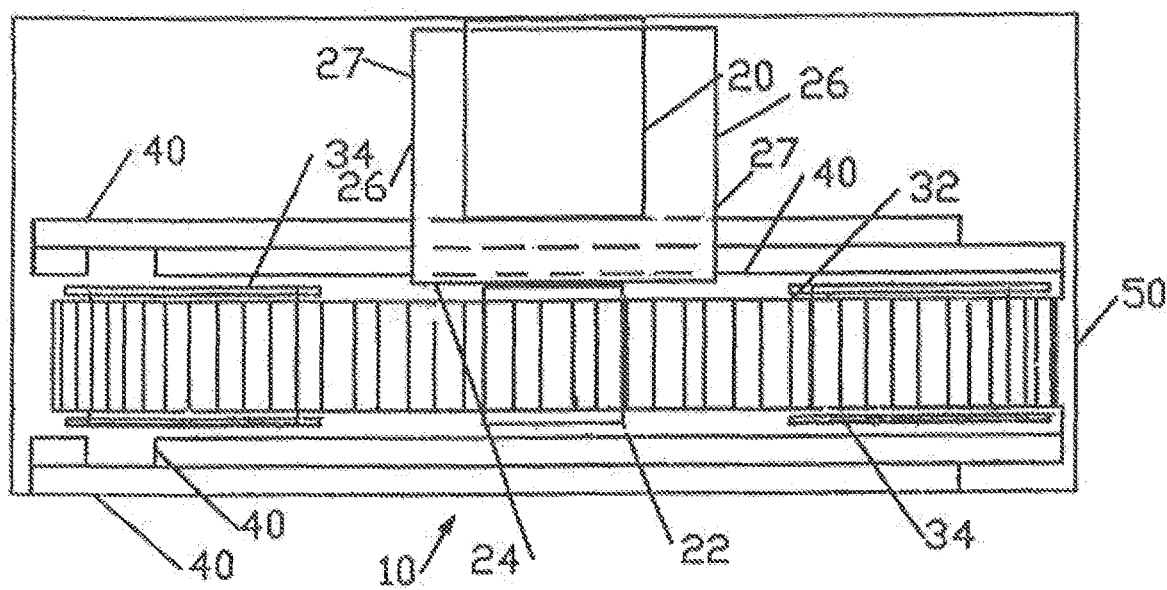
FIG. 2 is a plan view of a cargo handling power drive unit as illustrated in FIG. 1.
Figure 3:
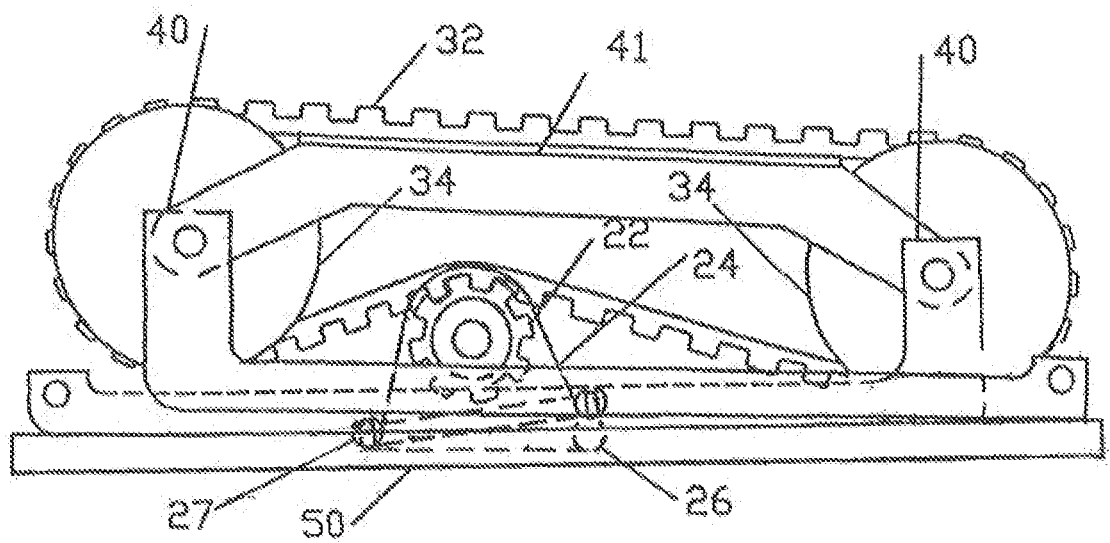
FIG. 3 is a perspective elevation view of the deployed cardo handling power drive unit in the deployed position with the cargo movement toward the left of the illustration.
Figure 4:
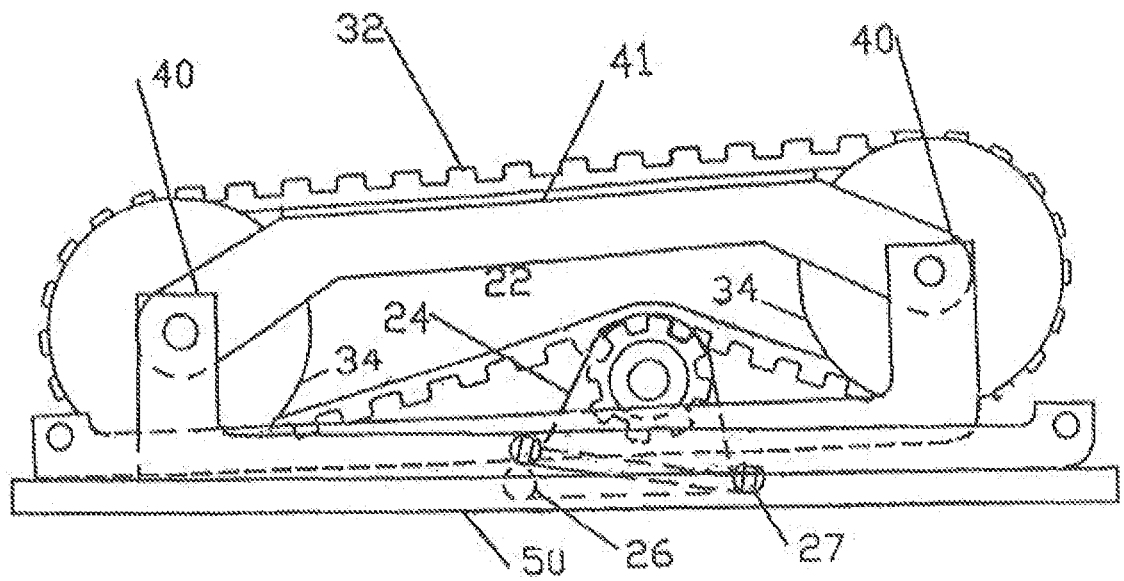
FIG. 4 is a perspective elevation view of the cargo handling power drive unit in the deployed position with the cargo movement toward the right of the illustration.
Figure 5:
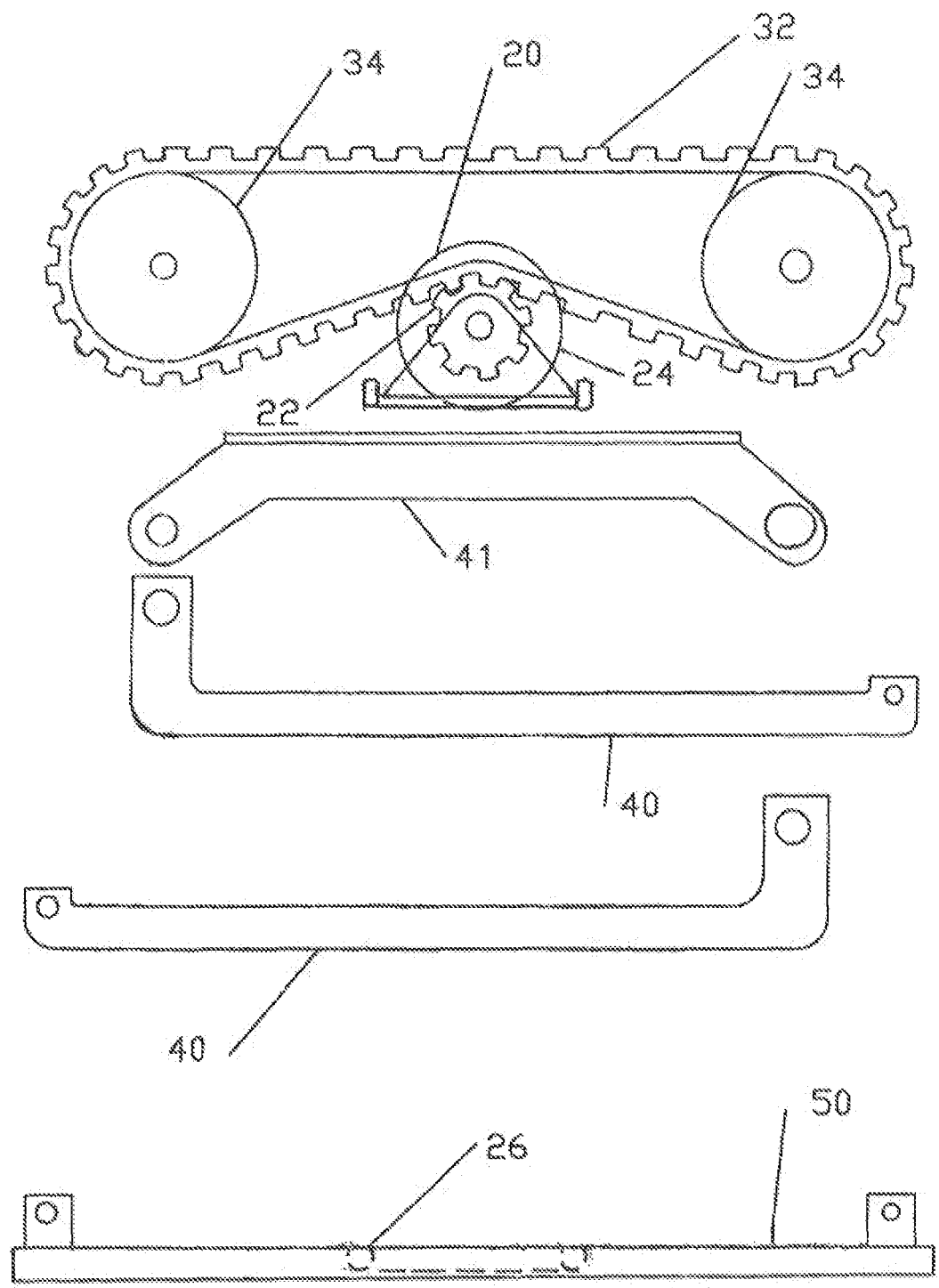
FIG. 5 is an exploded elevation side view of FIG. 1 to show the component parts of the cargo handling power drive unit of the present invention.
Figure 6:
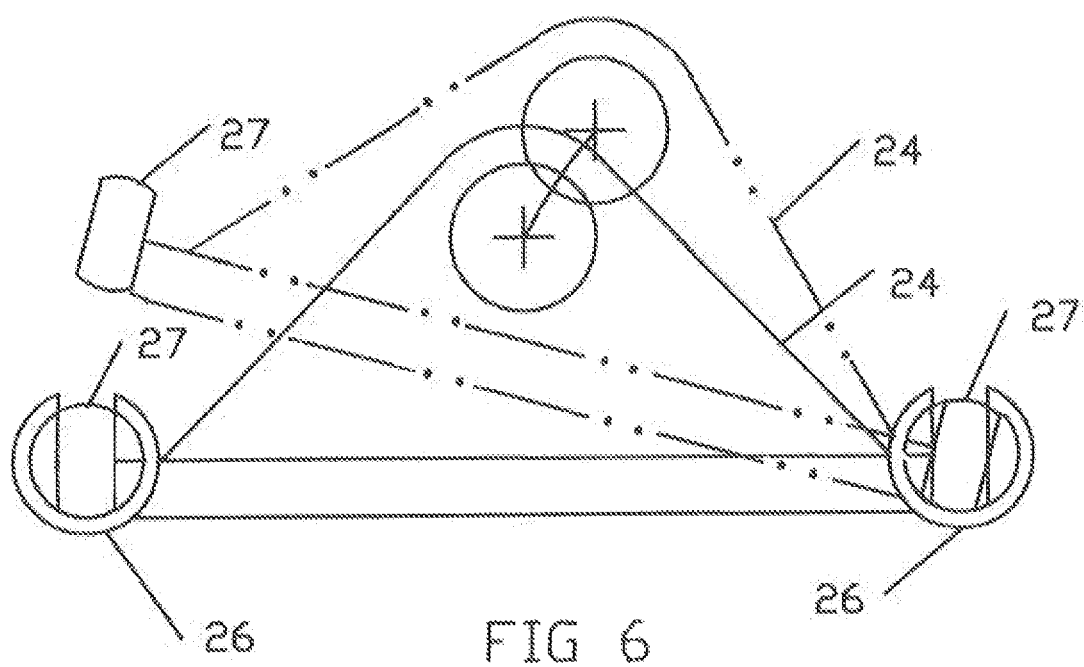
FIG. 6 is a partial elevation view of the hinged motor mount rotated about one hinge point.
Figure 7:
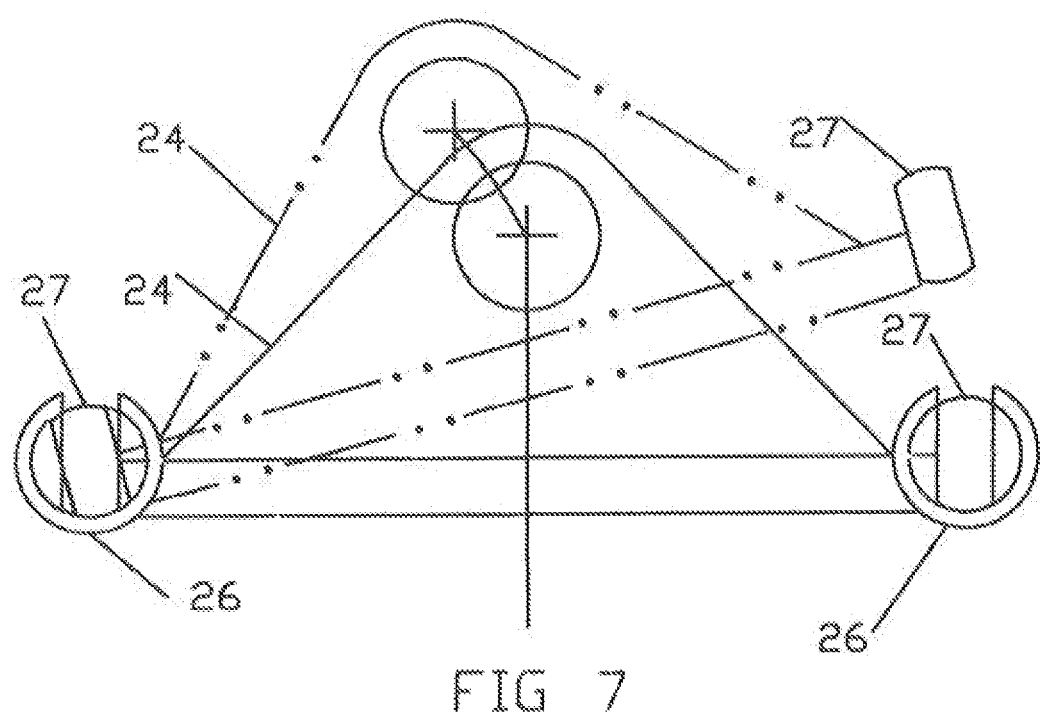
FIG. 7 is a partial elevation of the hinged motor mount rotated about the opposite hinge point as illustrated in FIG. 6.

The self-erecting cargo handling power drive unit assembly 10 as shown in FIG. 1 will move cargo in either a forward or aft direction. This is accomplished by a directional drive motor with auto-braking 20 and toothed drive sprocket 22 that are assembled with the hinged motor mount 24. The toothed drive sprocket 22 engages the cogs of the cog belt 32 which drives the smooth side of the cog belt around the idler pulleys 34 which are placed at both ends of the assembly and their axes of rotation parallel to the toothed sprocket 22.

What is claimed is:

1. A self-erecting cargo handling power drive unit 10 for installing at or below floor level of a cargo hold for movement of cargo or pallets either in the forward or aft direction comprising: a mounting base 50 having attachment means for securing to the floor area of a cargo hold; bi-directional motor and concentric toothed sprocket operably secured to a motor mount 24 which is double hinged and mounting the motor to the (PDU) mounting base unit 50; the hinge axes 26 are displaced laterally to either side and below the motor 20 and the toothed sprocket axial centerline to form a triangular configuration; two sets of two pivot arms 40 connected at ends of mounting base mounting two idler pulleys 34 relative and free to rotate in an arc around the connection to the mounting base the two idler pulleys 34 mounted between the rotatable ends of the pivot arms 40; a beam 41 connected between the two idler pulleys with a flat upper surface for cog belt support; a cog belt 32 running over the toothed sprocket, the flat upper surface, and around the idlers 34 with the toothed side of the cog belt 32 for applying tractive force to the cargo or pallet by way of the toothed sprocket 22.

2. A self-erecting cargo handling power drive unit as defined by claim 1 assembly wherein the motor 20, toothed sprocket 22 and motor mount 24 move in an upward arc opposite the motor 20 rotation and about the axis of the engaged side of the hinge 26 as the motor is energized, causing the idler pulley 34 and cog belt 32 on the end of the (PDU) toward cargo movement to move upward first contacting the bottom side of the cargo or pallet for reducing the shock of engagement.

3. A self-erecting cargo handling power drive unit (PDU) as defined in claim 2, wherein the hinged drive motor mount consists of the moveable upper part 24 and a fixed lower part 26 which is fastened to the mounting base 50; the two parts are joined by a double hinge with the axes of the hinges parallel to and displaced to either side and downward from the axis of the motor mount 24; the movable upper part of the hinge 27 is circular with flat sides arranged vertically which insert into the fixed lower part 26 which has a slotted cavity arranged vertically with the inside dimension of the cavity such that the circular surface of the movable upper hinge is a compression fit, the slotted cavity turning slightly inward with a radius to the opposite hinge; hinge, allowing the circular part with the flat side to move upward while the other side of the hinge is held with the flat sides moving out of alignment with the slot; such that sides of the hinge cannot disengage simultaneously during operation preventing inadvertent disassembly of the drive components.

4. A self-erecting cargo handling power drive unit (PDU) as defined in claim 1; wherein the reversible drive motor 20, toothed sprocket 22 and motor mount 24 approach either one or the other idler pulleys 34, depending on the rotation direction; this pulley 34 being approached by the toothed sprocket 26 rises first engaging the leading edge of the cog belt 32 with the cargo or pallet providing a smoother engagement.

5. A self-erecting cargo handling power drive unit (PDU) as defined in claim 1; wherein the power drive unit with self-activating brake will remain deployed for the purpose of holding the cargo or pallet in position as the reversible drive motor is de-energized; the power drive unit (PDU) retracts to the stowed position as or below floor level momentary reversal of the drive motor of rotation.

6. A self-erecting cargo handing power drive unit (PDU) as defined in claim 1; wherein a toothed cog belt contacts the cargo or pallet and provides a greater contact area than roller units and provides a greater tractive effort for wet condition operation is most effective during wet conditions.

\* \* \* \* \*